United States Patent
Nazimoudine et al.

(10) Patent No.: US 12,218,811 B2
(45) Date of Patent: Feb. 4, 2025

(54) LOG DATA PARSER AND ANALYZER

(71) Applicant: RAKUTEN SYMPHONY, INC., Tokyo (JP)

(72) Inventors: Faayiz Mougamadou Nazimoudine, Bangalore (IN); Sanjay Kumar Ushakoyala, Bangalore (IN); Deepak Kamat, Bangalore (IN); Charulata, Bangalore (IN); Serene Elizabeth Thomas, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 50 days.

(21) Appl. No.: 18/129,041

(22) Filed: Mar. 30, 2023

(65) Prior Publication Data
US 2024/0333616 A1    Oct. 3, 2024

(51) Int. Cl.
*G06F 15/16*    (2006.01)
*H04L 41/16*    (2022.01)
*H04L 43/06*    (2022.01)

(52) U.S. Cl.
CPC .............. *H04L 43/06* (2013.01); *H04L 41/16* (2013.01)

(58) Field of Classification Search
CPC ................................ H04L 43/06; H04L 41/16
See application file for complete search history.

(56) References Cited

U.S. PATENT DOCUMENTS

2022/0138556 A1* 5/2022 Richardson ........... G06F 16/258
                                                                706/25
2023/0315603 A1* 10/2023 Pham ....................... G06N 5/02
                                                                707/600

OTHER PUBLICATIONS

NPL, Rakhmetova et al. "Conceptual Modelling of Log Files: From a UML-based Design to JSON Files"; Proceedings of the ER Demos and Posters 2021 (Year: 2021).*

* cited by examiner

*Primary Examiner* — Padma Mundur
(74) *Attorney, Agent, or Firm* — HAUPTMAN HAM, LLP

(57) ABSTRACT

A network management system includes a non-transitory computer readable medium configured to store instructions thereon. The network management system further includes a processor connected to the non-transitory computer readable medium. The processor is configured to execute the instructions for receiving first log data from a first component in a network, wherein the first log data includes first log information; and parsing the first log data using a trained neural network to define parsed log data, wherein parsing the first log data includes organizing the first log information into a predefined sequence of information, and the parsed log data includes at least a signal source and a signal message. The processor is configured to execute the instructions for generating a unified model language (UML) diagram based on the parsed log data; and determining whether an error is present in the first component based on the UML diagram.

20 Claims, 7 Drawing Sheets

LOG DATA PARSER AND ANALYZER

TECHNICAL FIELD

This description relates to a network management system including a log data parser and analyzer as well as a method of using the network management system.

BACKGROUND

Network managers utilize log data to determine a health of a network. The log data indicates how devices within the network function and interact. In some instances, the log data includes information related to failures or errors within the network. The network manager is able to analyze the log data to identify failures or errors in order to locate and repair problems or errors within the network. This identification includes identification of a device that is likely a source of the error or problem. The network manager is then able to take remedial measure to repair or replace the device to improve the health of the network.

In an open network, such as an open radio access network (O-RAN), devices from different manufacturers are utilized in the network. These devices from different manufacturers report log data in a variety of different formats. In addition, in some instances, a responsibility for a network manager is limited to a certain set of devices within the network for reasons such as security or to distribute workload over a larger number of network managers. As a result, in some instances, a network manager responsible for one device is not able to analyze data for another device or repair that other device.

SUMMARY

A network management system includes a non-transitory computer readable medium configured to store instructions thereon. The network management system further includes a processor connected to the non-transitory computer readable medium. The processor is configured to execute the instructions for receiving first log data from a first component in a network, wherein the first log data comprises first log information. The processor is configured to execute the instructions for parsing the first log data using a trained neural network to define parsed log data, wherein parsing the first log data comprises organizing the first log information into a predefined sequence of information, and the parsed log data comprises at least a signal source and a signal message. The processor is configured to execute the instructions for generating a unified model language (UML) diagram based on the parsed log data. The processor is configured to execute the instructions for determining whether an error is present in the first component based on the UML diagram.

A network management method comprising receiving first log data from a first component in a network, wherein the first log data comprises first log information. The network management method includes parsing, using a processor, the first log data using a trained neural network to define parsed log data, wherein parsing the first log data comprises organizing the first log information into a predefined sequence of information, and the parsed log data comprises at least a signal source and a signal message. The network management method includes generating, using the processor, a unified model language (UML) diagram based on the parsed log data. The network management method includes determining, using the processor, whether an error is present in the first component based on the UML diagram.

A non-transitory computer readable medium configured to store instructions thereon for causing a processor to receive first log data from a first component in a network, wherein the first log data comprises first log information. The instructions are configured to cause the processor to parse the first log data using a trained neural network to define parsed log data, wherein parsing the first log data comprises organizing the first log information into a predefined sequence of information, and the parsed log data comprises at least a signal source and a signal message. The instructions are configured to cause the processor to generate a unified model language (UML) diagram based on the parsed log data. The instructions are configured to cause the processor to determine whether an error is present in the first component based on the UML diagram.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
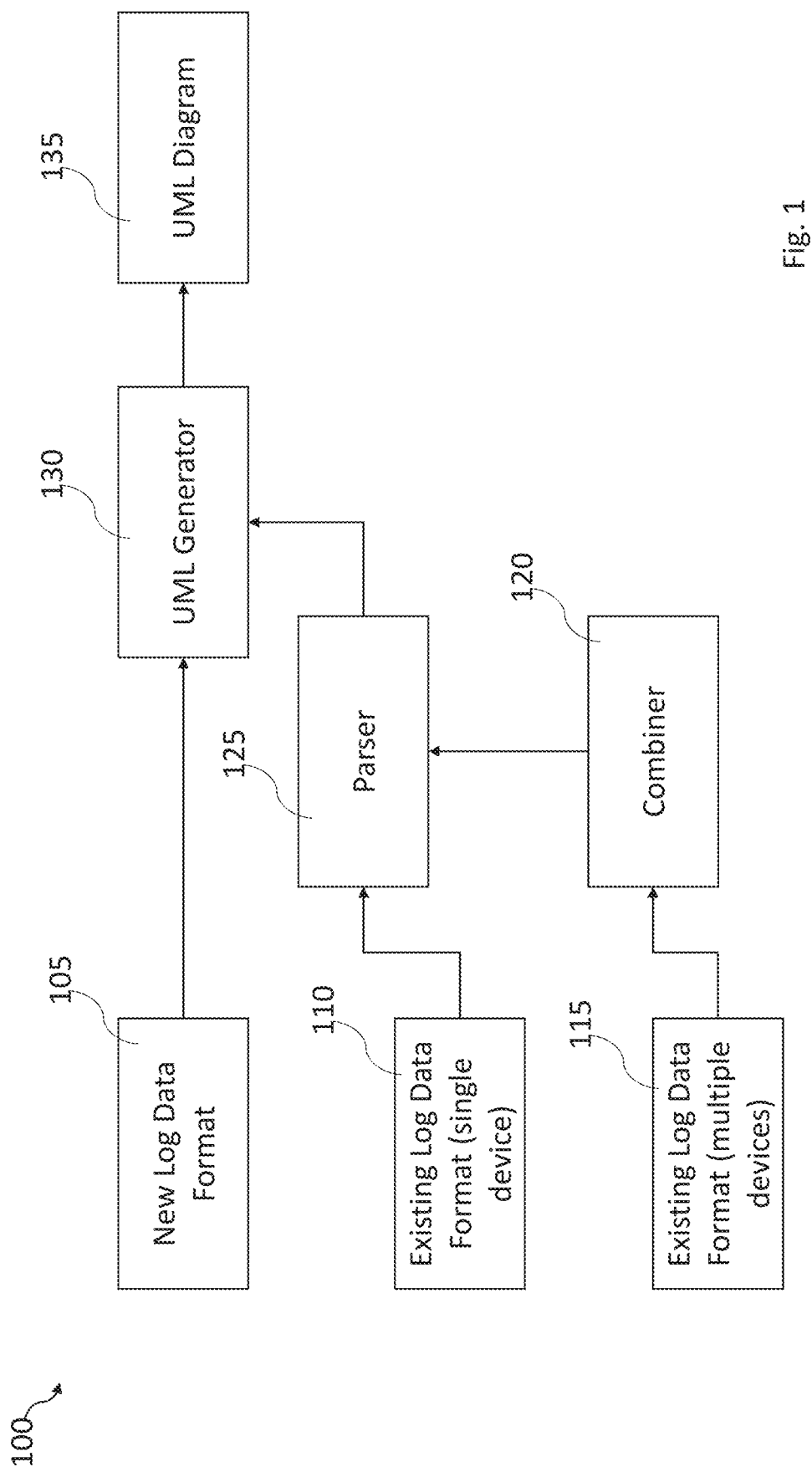
FIG. 1 is a block diagram of a network management system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below." "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or data-streams or signaling-streams. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, or data-streams or signaling-streams from a UE.

Log data is usable to identify sources of error within a network. In some instances, network managers are responsible for monitoring certain sets of devices within the network. The network managers are able to review log data for information regarding the health of the set of devices within the network. In some instances, the log data for different devices has a different format due to manufacturer or user designed aspects of the device. In such situations, the network manager would decipher the log data in order to perform an analysis to attempt to identify a source of an error within the network.

In some instances, network managers have limited or no access to devices outside of the set of devices. For example, in some instances a security level of some devices exceeds a security level of the network manager. In such circumstances, the network manager would have difficulty resolving errors in the network that involve devices to which the network manager has limited or no access.

The current description helps to improve efficiency in log data analysis by parsing log data to be in a uniform format. The uniform format for log data allows automated analysis of the log data and permits faster and more precise identification of errors within the system. The parser is able to use a train neural network that is able to recognize key terms within the log data of a wide variety of reporting formats for log data. The parser is then able to simplify the log data for automated analysis.

Additionally, by parsing the log data, sensitive data is able to be excluded from the parsed log data. The exclusion of sensitive data would allow analysis or viewing of the parsed log data by systems accessible by users that lack authorization to access the devices from which the log data concerns. In some instances, the log data includes both an origination device as well as a destination device. In other approaches where a user is not allowed access one of the devices related to the log data, the user would not be able to view the log data which makes error identification more difficult. By parsing the log data and automatically analyzing the parsed log data, identification of errors is improved in both speed and precision in comparison with other approaches.

In some instances, training of the neural network used by the parser is based on information input by network managers. In some instances, the training data includes rules, keywords, events, message transactions, device information, or other suitable training data. Using the training data, the neural network is trained to allow the parser to identify relevant information within the log data and automatically analyze the relevant information with little or no user interaction. In some instances, the neural network also learns recursively as new log data is parsed in order to help improve and expand the usefulness of the neural network in analyzing log data within the network.

Figure 7:
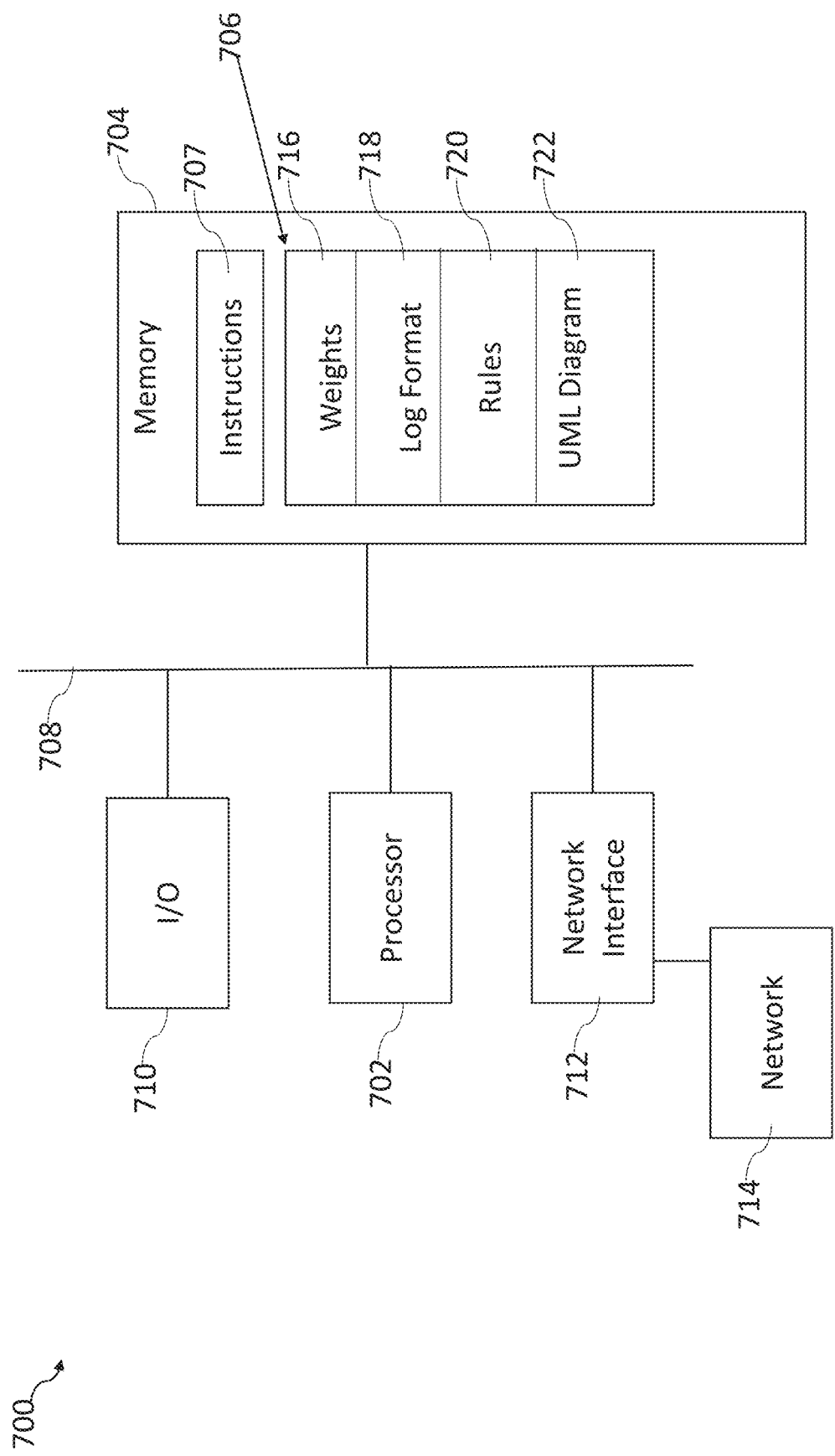
FIG. 7 is a block diagram of a network management system, in accordance with some embodiments.

FIG. 1 is a block diagram of a network management system 100, in accordance with some embodiments. In some embodiments, the network management system 100 is implemented using a network management system 700 (FIG. 7). In some embodiments, the network management system 100 is implemented using one or more devices other than the network management system 700 (FIG. 7). The network management system 100 is usable to process both newly received log data as well as existing log data, e.g., log data retrieved from storage. By processing both new log data and existing log data, the network management system 100 is able to be implemented in a manner to reduce backlog of log data analysis for existing networks. The network management system 100 is configured to parse log data that has an existing or older format to place the log data in a unified model language (UML) format. Using the UML format, the network management system 100 is able to generate a UML diagram that includes different components within the network as well as relationships between the components in the network. The UML diagram based on the parsed log data permits more efficient analysis of the log data to identify errors within the network. In some embodiments, the UML diagram facilitates automated analysis of the log data and generation of alert messages for likely errors within the network. As a result, the network management system 100 is able to reduce a time period for error identification, which in turn permits faster error resolution, better network performance, and increased customer satisfaction in comparison with other approaches.

Log data is generated by components of the network during operation of the network in order to indicate actions taken by the components and whether those actions resulted in success or failure. As a number of failures indicated by the log data increases, an overall health of the network decreases. The log data is receivable in either a new format or an existing format. The new format includes simplified log data to complies with parsing rules. In some instances, software updates are performed on one or more components in the network to instruct the components to generate log data in the new log data format. The existing log data format is a log data format defined by the manufacturer of the component. In open networks, such as O-RAN, components from many different manufacturers are able to be included in the network. As a result, the network management system 100 utilizes parsing in order to compile log data receiving in a variety of different formats.

The network management system 100 is capable of receiving new log data format at 105. The network management system 100 is capable of receiving existing log data format involving a single device at 110. The network manage system 100 is capable of receiving existing log data format involving multiple devices at 115. In some embodiments, each of the types of log data received by a same component, such as a transceiver, a receiver, or another suitable component. In some embodiments, at least one type of log data is received by a different component from at least one other type of log data, e.g., by two different receivers. In some embodiments, at least one type of log data is received wirelessly. In some embodiments, at least one type of log data is received via a wired connection.

The network management system 100 includes a combiner module 120. The combiner module is configured to combine the existing log data format related to multiple devices from 115. The combiner module 120 is usable to help determine whether actions performed by multiple components, such as transmission of signals, is performed successfully. Being able to monitor the interaction between different components within the network helps the network management system 100 to assist with identification of errors even when a network manager is unfamiliar or lacks access to one of the components involved in the interaction. In some embodiments, the combiner module 120 is configured to combine the log data based on time stamp information. In some embodiments, the combiner module 120 is configured to combine the log data based on a type of signal transmitted. For example, if a start timing card.0 signal is transmitted from a radio interface, then the combiner module 120 would know which S-plane module was involved in the communication of the signal based on a network inventory of the network. By knowing which two components were involved in the communication of the signal, the combiner module 120 is able to combine the logs from both the radio interface and the S-plane module in order to provide a more complete understanding of the performance of the network. The network inventory of the network includes information related to components within the network as well as connections between different components within the network. In some embodiments, the network inventory of the network is stored in a database accessible by the combiner module 120.

The network manager 110 further includes a parser module 125 configured to receive both the existing log data format related to a single device and the combined existing log format data related to multiple devices. The parser module 125 is configured to recognize information in the log data, organize the information in the log data, and filter out portions of the log data not relied upon by the network management system 100 for log data analysis or generation of the UML diagram. In some embodiments, the parser module 125 is configured to extract information from the log data related to a source component, a destination component, a message, a time stamp, or other suitable information. The message includes information relate to a type of signal or action being transmitted or performed by the components. For example, in some instances, the message includes "Timing Locked," "start Cert Subscribe," or another suitable message. One of ordinary skill in the art would understand that these messages are merely examples and that other messages are within the scope of this description.

Figure 4:
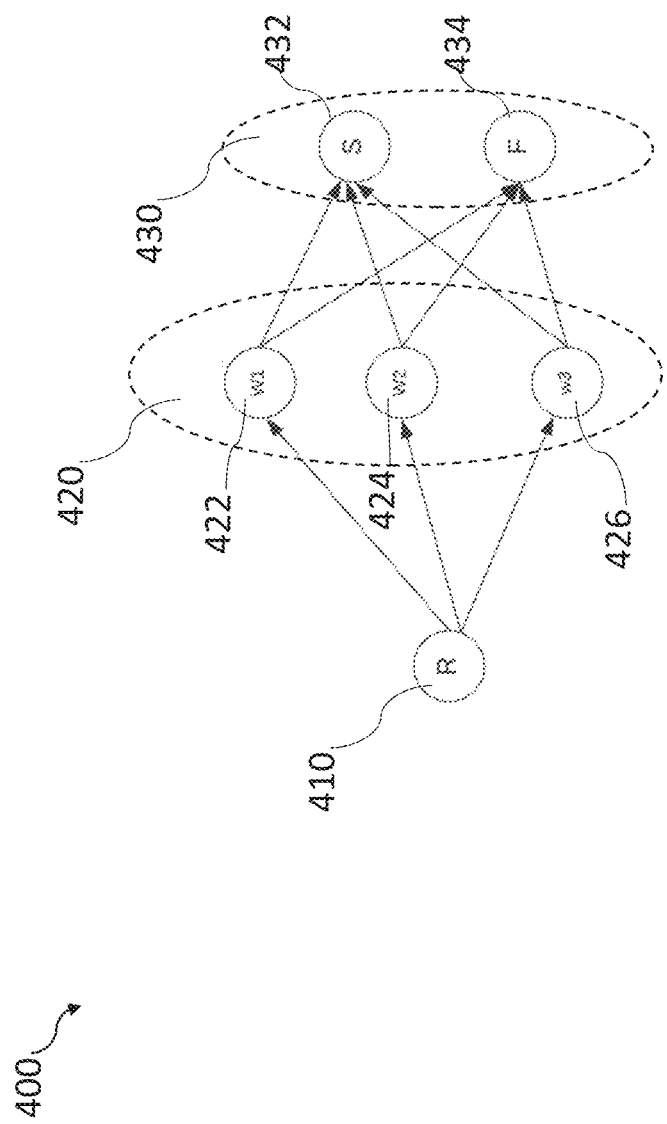
FIG. 4 is a schematic diagram of a neural network, in accordance with some embodiments.

In some embodiments, the parser module 125 is implemented using a trained neural network. In some embodiments, the parser module 125 is trained using training data including log data having formats from a variety of different manufacturers. Training the parser module 125 based on log data from a variety of different manufacturers helps to improve the ability of the parser module 125 to accurately and precisely recognize information in the log data format defined by the manufacturer. In some embodiments, feedback is provided to the parser module 125 during operation of the network management system 100 to help improve performance of the neural network. In some embodiments, the parser module 125 is implemented using a neural network 400 (FIG. 4). In some embodiments, the parser module 125 is implemented using a neural network other than the neural network 400 (FIG. 4).

The following description provides several examples for how log data is formatted by the network management system 100. One of ordinary skill would understand that these examples are merely for illustrative purposes and that this description is not limited to these examples.

In a first example, the following log data is received at 110:
2022-12-15 15:25:36-7-radio interface[31] 179252.953243 0.000011 rim-sm.c:715 Radio Interface now in state Wait-ForCert after event StartSubscribeCert on card.0

This log data includes information related to a component, a timestamp, a type of action being performed by the component. The parser module 125 receives the log data and identifies the component and the type of action being performed. Based on the component and the type of action being performed the parser module 125 is able to determine with which other component within the network the component is communicating, e.g., using a network inventory. The parser module 125 is then able to organize the information in the log data as follows:
Radio Interface Certification Module 2022-12-15 15:25:36 2022-12-15 15:25:36-7-radio interface[31] 179252.953243 0.000011 rim-sm.c:715 radio interface now in state Wait-ForCert after event StartSubscribeCert on card.0

Next the parser module 125 is further configured to filter out information from the organized log data based on a design of the neural network executed by the parser module 125. The filtered log data output to the UML generator module 130 is as follows:
Radio Interface Certification Module start Cert Subscribe The filtered log data includes a source component, Radio Interface; a destination component, Certification Module; and a message, start Cert Subscribe. One of ordinary skill in the art would recognize that additional information, such as timestamp information, is able to be included in the filtered log data.

In a second example, the following log data is received at 110:
2022-12-15 15:25:51-7-Radio Interface[31] 179267.611891 0.000011 rim-sm.c:715 Radio Interface now in state Wait-ForDpllLock after event TimingOk on card.0

This log data includes information related to a component, a timestamp, a type of action being performed by the component. The parser module 125 receives the log data and identifies the component and the type of action being performed. Based on the component and the type of action being performed the parser module 125 is able to determine with which other component within the network the component is communicating, e.g., using a network inventory. The parser module 125 is then able to organize the information in the log data as follows:
S-Plane Module Radio Interface 2022-12-15 15:25:51 2022-12-15 15:25:51-7-Radio Interface[31] 179267.611891 0.000011 rim-sm.c:715 Radio Interface now in state Wait-ForDpllLock after event TimingOk on card.0

Next the parser module 125 is further configured to filter out information from the organized log data based on a design of the neural network executed by the parser module 125. The filtered log data output to the UML generator module 130 is as follows:
S-Plane Module Radio Interface Timing Locked The filtered log data includes a source component, S-Plane Module; a destination component, Radio Interface; and a message, Timing Locked. One of ordinary skill in the art would recognize that additional information, such as timestamp information, is able to be included in the filtered log data.

The network management system 100 further includes a UML generator module 130 configured to receive log data in the new format or parsed log data from the existing format. The UML generator module 130 is configured to identify components related to the received log data and a relationship between the components. In some embodiments, the UML generator module 130 is further configured to determine one or more attributes of the components based on the message in the received log data or based on the network inventory of the network. The UML generator module 130 is configured to analyze the message information from the received log data to determine whether an error occurred within a component or during the communication of multiple components of the network.

The UML diagram module 135 is configured to receive information from the UML generator module 130 and generate a UML diagram. A UML diagram includes a diagram of components of the network as well as relationships between components of the network. In some embodiments, the UML diagram further includes one or more attributes for the components based on the information received from the UML generator module 130. In some embodiments, the UML diagram further includes information related to whether an error occurred within a component or during communication between multiple components. The UML diagram module 135 is able to determine an error occurred based on the information received from the UML generator module 130.

The UML diagram is useful for identifying errors within the network by allowing a network manager to visualize the relationships between the components and see where errors occurred within the network. The UML diagram allows identification of errors even for components for which the network manager does not have responsibility or does not have access. For example, in a situation where the network manager is responsible for monitoring and maintenance of only a first component and an error is occurring because the first component is not receiving proper information, the network manager would be able to diagnose and repair a problem within the first component, e.g., by restarting a receiver of the component. However, if the reason for the failure to receive proper information is due to a problem with a second component, which the network manager does not monitor or does not have access to, there would be no way for the network manager to effectively resolve the error independently. In some instances, the network manager is not even able to determine that an error exists within the second component. In such a situation, the network manager would expend effort and resources to attempt to fix the first component without success.

In contrast to the above situation, the UML diagram would permit the network manager to identify that an error is occurring within the second component without accessing or monitoring the second component. As a result, a repair request is able to be sent to a monitor of the second component to fix the error and restore the proper communication between the first component and the second component.

While the above description mentions a network manager, the network management system 100 is not limited to embodiments involving a network manager. In some embodiments, the network management system 100 is configured to automatically identify errors based on the parsed log data or the log data in the new format. The network management system 100 is then able to utilize the UML diagram to determine which components are impacted by the identified error and generate an alert for each of the impacted components. In some embodiments, the alert includes an audio alert or a visual alert. In some embodiments, the network management system 100 is configured to automatically transmit the alert, either wirelessly or via a wired connection, to a user terminal accessible by a network manager to cause the user terminal to display the alert. In some embodiments, the alert includes a recommendation for remedial efforts for resolving the error. In some embodiments, a neural network is utilized to identify likely remedial efforts for resolving the error. In some embodiments, a decision tree is utilized to identify likely remedial efforts for resolving the error. In some embodiments, the remedial efforts include restarting the component, updating software executed by the component, dispatching a maintenance team to repair or replace the component, or other suitable remedial efforts.

In some embodiments, each of the modules or neural networks described above is implemented using the network management system 700 (FIG. 7). In some embodiments, each of the modules or neural networks described above is implemented using hardware other than the network management system 700 (FIG. 7).

In comparison with other approaches, the network management system 100 is able to receive log data in a variety of formats. The network management system 100 is then able to parse log data that is in a non-updated, i.e., existing, format to extract relevant information from the log data to format the parsed log data in an updated, i.e., new, format. The network management system 100 is able to utilize the updated format log data to generate a UML diagram that is usable for identifying errors within the network. The network management system 100 is also able to generate alerts for resolving errors within the network in order to help improve the performance of the network and increase customer satisfaction.

Figure 2:
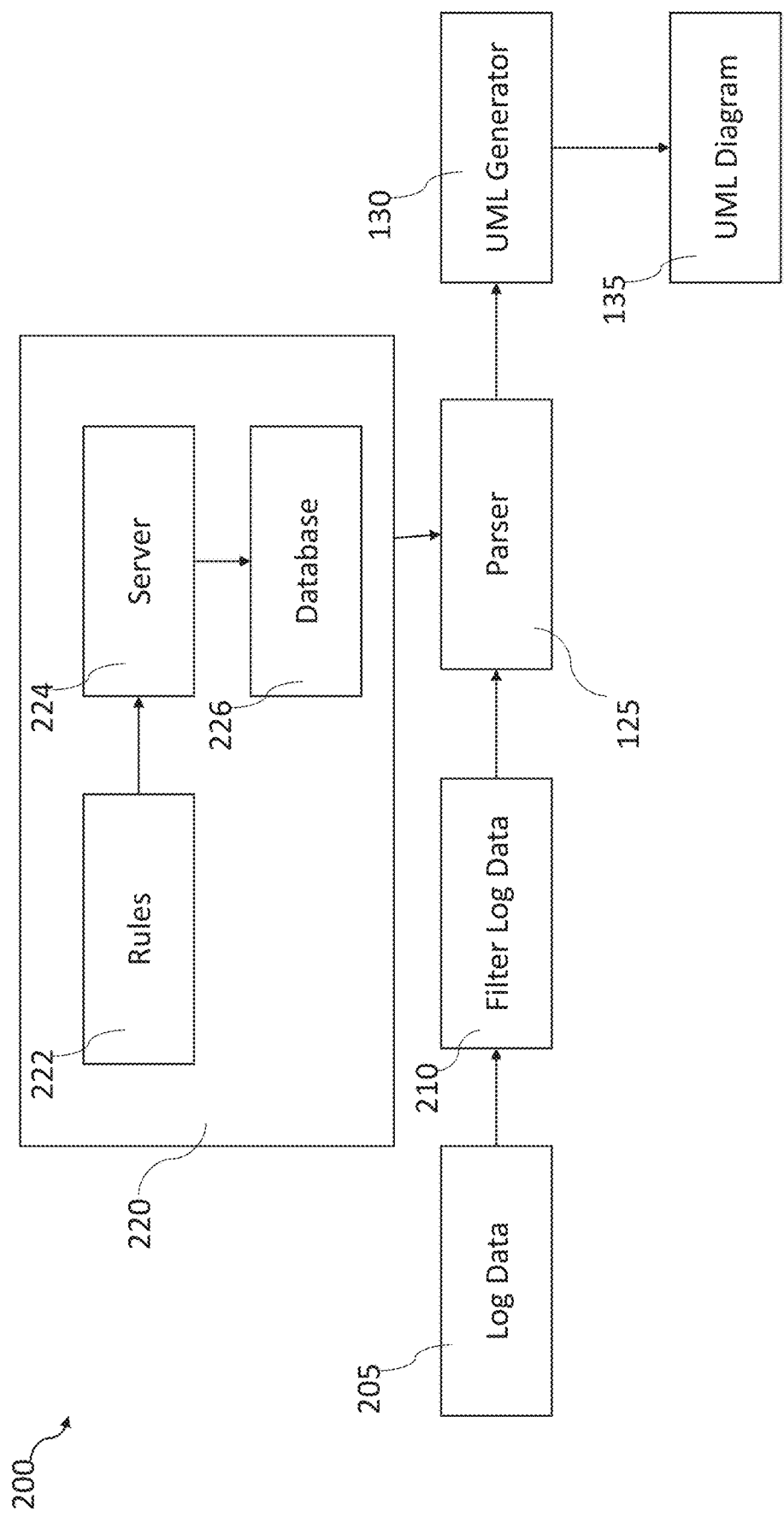
FIG. 2 is a block diagram of a network management system, in accordance with some embodiments.

FIG. 2 is a block diagram of a network management system 200, in accordance with some embodiments. In some embodiments, the network management system 200 is capable of operating in conjunction with the network management system 100 (FIG. 1). In some embodiments, the network management system 200 is implemented using a network management system 700 (FIG. 7). In some embodiments, the network management system 200 is implemented using one or more devices other than the network management system 700 (FIG. 7). The network management system 200 is usable to process received log data at 205. In some embodiments, the log data includes new format log data, such as that received at 105 (FIG. 1), or existing format log data, such as that received at 110 or 115 (FIG. 1). The network management system 200 is configured to filter and parse the log data to place the log data in a unified model language (UML) format. Using the UML format, the network management system 200 is able to generate a UML diagram that includes different components within the network as well as relationships between the components in the network. The UML diagram based on the parsed log data permits more efficient analysis of the log data to identify errors within the network. In some embodiments, the UML diagram facilitates automated analysis of the log data and generation of alert messages for likely errors within the network. As a result, the network management system 200 is able to reduce a time period for error identification, which in turn permits faster error resolution, better network performance, and increased customer satisfaction in comparison with other approaches. The network management system 200 includes some elements that are similar to elements in the network management system 100 (FIG. 1). Elements that are similar have a same reference number and are not discussed in detail for the sake of brevity.

In comparison with the network management system 100 (FIG. 1), the network management system 200 received log data at 205. As noted above, the log data is in either the new format or the existing format. In some instances, the log data is related to a single component in the network. In some instances, the log data is related to multiple components in the network. In some embodiments, the log data is new log data received as the network is operating. In some embodiments, the log data is retrieved from a storage, such as a server, and includes historical log data. In some embodiments, the log data is received wirelessly. In some embodiments, the log data is received via a wired connection. In some embodiments, the log data received at 205 undergoes a combining operation similar to that described above with respect to the combiner module 120 (FIG. 1).

The network management system 200 further includes a filter module 210 configured to filter the log data. The filter module 210 is configured to remove extraneous information from the log data that is not relevant to error identification or error repair. In some embodiments, the filter module 210 is configured to remove the extraneous information based on filtering rules defined by a network manager. In some embodiments, the filtering rules are stored in a storage medium accessible by the filter module 210. In some embodiments, the filtering rules are determined based on empirical data. In some embodiments, the filtering rules are determined based on experience of the network manager. In some embodiments, the filtering rules are determined based on a UML format utilized by the network management system 200.

The network management system 200 further includes a rule engine 220. The rule engine 220 is configured to receive rule information from a network manager or from a neural network. The rule engine 220 is configured to store the rule information in a manner that is accessible by the parser module 125 in order to permit the parser module 125 to organize the information in the filtered log data to allow conversion of the log data to the UML. In some embodiments, the rule information is received from the network manager based on expertise of the network manager. In some embodiments, the rule information is based on empirical data based on past operation of the network. In some embodiments, the rule information is generated or updated by a neural network. In some embodiments, the neural network utilized for updating the rule information is a same neural network as that used by the parser module 125. In some embodiments, the neural network utilized for updating the rule information communicates with the neural network used by the parser module 125.

The rules engine 220 is configured to receive the rule information at 222. The rule information is usable for identifying portions of log data that are usable for identifying errors in the performance of the network. In some embodiments, the rule information is specific to a component within the network. In some embodiments, the rule information is specific to a manufacturer. In some embodiments, the rule information is generic to multiple components or multiple manufacturers. In some embodiments, the rule information is received from the network manager, e.g., using a graphical user interface (GUI). In some embodiments, the rule information is received from a neural network. In some embodiments, the rule information is received wirelessly. In some embodiments, the rule information is received via a wired connection.

The rule information is stored in a server 224. In some embodiments, the server 224 is configured to receive rule information from a plurality of different sources. For example, in some embodiments, the server 224 is configured to receive rule information from multiple different network managers. In some embodiments, the network managers are responsible for different components within the network and the rule information received by the server 224 is unique to the components managed by the different network managers. The server 224 is configured to compile the received rule information and store the compiled rule information on a database 226. In some embodiments, the server 224 is configured to update the rule information stored in the database 226 based on new rule information received by the server 224. For example, as a neural network utilized by the parser module 125 processes log data, the neural network suggests new rule information in some embodiments. In some embodiments, the network manager updates the rule information as new components are introduced into the network or as new empirical data becomes available during operation of the network.

In some embodiments, the server 224 utilizes a neural network to generate weights for use by the neural network utilized in the parser module 125 during processing of the log data. In some embodiments, the server 224 instructs the database 226 to store the weights in association with the rule information to allow the parser module 125 to access the weights based on information in the received log data.

The database 226 includes a non-transitory computer readable medium for storing the compiled rule information. The database 226 is accessible by the parser module 125 for assisting the parser module 125 in filtering and extracting information from the log data to assist in formatting the log data in the UML. In some embodiments, the database 226 includes multiple different storage mediums. In some embodiments, the database 226 includes a single storage medium. In some embodiments, the database 226 is integral with the server 224. In some embodiments, the database 226 is separate from the server 224.

The parser module 125 is configured to operate in a similar manner as described above with respect to the network management system 100 (FIG. 1). The parser module 125 is able to retrieve rule information from the rules engine 220 for use in filtering and formatting of the log data. In some embodiments, the parser module 125 is configured to receive weight information from the rules engine 220 usable by the neural network of the parser module 125 to process the log data.

In some embodiments, each of the modules, neural networks or server described above is implemented using the network management system 700 (FIG. 7). In some embodiments, each of the modules, neural networks or server described above is implemented using hardware other than the network management system 700 (FIG. 7).

In comparison with other approaches, the network management system 200 is able to receive log data in a variety of formats. The network management system 200 is then able to receive rule information and generate weights for use by a neural network to facilitate processing of the log data. The network management system 200 is able to format log data to generate a UML diagram that is usable for identifying errors within the network. The network management system 200 is also able to generate alerts for resolving errors within the network in order to help improve the performance of the network and increase customer satisfaction.

Figure 3:
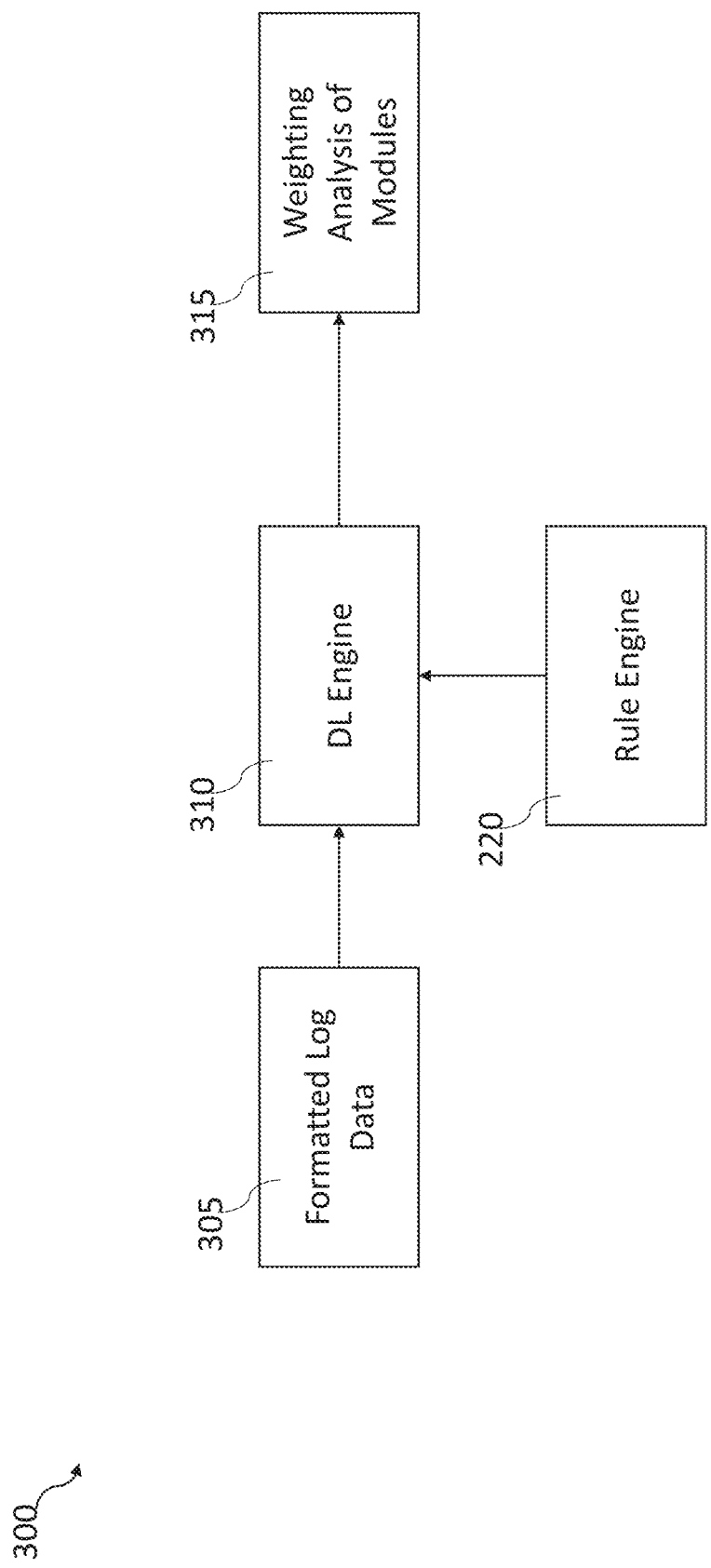
FIG. 3 is a block diagram of a machine learning system, in accordance with some embodiments.

FIG. 3 is a block diagram of a machine learning system 300, in accordance with some embodiments. In some embodiments, the machine learning system 300 is capable of operating in conjunction with the network management system 100 (FIG. 1) or the network management system 200 (FIG. 2). In some embodiments, the machine learning system 300 is implemented using a network management system 700 (FIG. 7). In some embodiments, the machine learning system 300 is implemented using one or more devices other than the network management system 700 (FIG. 7). The machine learning system 300 is usable to generate weights for use by a neural network for processing log data. In some embodiments, the machine learning system 300 is usable to train the neural network for processing log data. In some embodiments, the log data includes new format log data, such as that received at 105 (FIG. 1), or existing format log data, such as that received at 110 or 115 (FIG. 1). The machine learning system 300 includes some elements that are similar to elements in the network management system 200 (FIG. 2). Elements that are similar have a same reference number and are not discussed in detail for the sake of brevity.

The machine learning system 300 received formatted log data at 305. In some embodiments, the formatted log data includes training data for training a neural network. Training data includes input data for which an expected output is known. Utilizing training data for training a neural network helps the neural network adjust weights for different nodes within the neural network to improve accuracy and precision of outputs of the neural network once the neural network is put into operation. In some embodiments, the formatted log data has the new log data format, as discussed above. In some embodiments, the formatted log data is generated by a parser, such as parser module 125 (FIG. 1 or FIG. 2).

The machine learning system 300 includes a deep learning (DL) engine 310. The DL engine 310 receives rule information from the rule engine 220 and the formatted log data. The DL engine 310 processes the formatted log data utilizing the rule information in order to generate parsed log data. In some embodiments, the DL engine 310 is deployed as the parser module 125 (FIG. 1 or FIG. 2) following training of the DL engine 310. The parsed log data is output from the DL engine 310 and is analyzed to determine the accuracy of the parsed log data in comparison with an expected output. Based on differences between the parsed log data output the by the DL engine 310 and the expected output, weights for one or more nodes within the DL engine 310 are updated. The processing of formatted log data and updating of weights for one or more nodes is repeated until the DL engine 310 converges and the parsed log data has a satisfactory level of accuracy and precision.

Once the DL engine 310 has reached convergence, the weights for the nodes within the DL engine 310 are stored in a database 315 for the weighting analysis of modules utilizing a neural network of the DL engine 310. The database 315 is accessible by network management systems, such as network management system 100 (FIG. 1), network management system 200 (FIG. 2), or other suitable network management systems, for processing of log data. In some embodiments, the database 315 is integrated with the DL engine 310. In some embodiments, the database 315 is separate from the DL engine 310.

In some embodiments, each of the engines or neural networks described above is implemented using the network management system 700 (FIG. 7). In some embodiments, each of the engines or neural networks described above is implemented using hardware other than the network management system 700 (FIG. 7).

In comparison with other approaches, the machine learning system 300 is able to generate weights for use by a neural network for processing log data. Using the weights, network management systems, such as network management system 100 (FIG. 1), network management system 200 (FIG. 2), or another suitable network management system, is able to use a neural network to facilitate processing of the log data. The network management system is then able to format log data to generate a UML diagram that is usable for identifying errors within the network. The network management system is also able to generate alerts for resolving errors within the network in order to help improve the performance of the network and increase customer satisfaction. The use of the machine learning system 300 helps to improve accuracy and efficiency of the network management system without interaction with the network manager during processing of the log data.

FIG. 4 is a schematic diagram of a neural network 400, in accordance with some embodiments. In some embodiments, the neural network 400 is usable by the parser module 125 (FIG. 1 or FIG. 2). In some embodiments, the neural network 400 is usable by the DL engine 310 (FIG. 3). In some embodiments, the neural network 400 is implemented using the network management system 700 (FIG. 7). In some embodiments, the neural network 400 is implemented using hardware other than the network management system 700 (FIG. 7).

The neural network 400 includes an input 410, a hidden layer 420, and an output layer 430. For the sake of simplicity, the neural network 400 includes a single hidden layer 420. One of ordinary skill in the art would understand that in some embodiment, the neural network includes more than one hidden layer 420. In some embodiments, the input 410 includes formatted log data, such as the formatted log data received at 305 (FIG. 3). The log data is analyzed by the neural network 400 based on the weights for each of the nodes 422, 424 and 426 of the hidden layer 420. One of ordinary skill in the art would understand that in some embodiment, the neural network includes more than three nodes in the hidden layer 420.

The neural network 400 outputs a likelihood of each of the options in the output layer 430. That is, a first percentage is output to node 432 of the output layer 430 and a second percentage is output to node 434 of the output layer 430. One of ordinary skill in the art would understand that in some embodiment, the neural network includes more than two nodes in the output layer 430. During a training of the neural network 400, a comparison between the results in the output layer 430 and an expected result is used to update the weights for each of the nodes 422, 424 and 426 of the hidden layer 420. The updating of the hidden layer 420 is repeated until the results in the output layer 430 converge and satisfy design criteria for the neural network 400. Following the training, the neural network 400 is usable by a system, such as network management system 100 (FIG. 1), network management system 200 (FIG. 2), machine learning system 300 (FIG. 3), or another suitable system.

The percentages in the output layer 430 are usable to determine information within the input 410. For example, for a network including two components and formatted log data being related to a single component, the neural network 400 will receive the formatted log data at input 410. The neural network 400 will use the weights at each of the nodes 422, 424 and 426 of the hidden layer 420 to determine which of the two components is likely related to the formatted log data. The likelihood of the first component is output to the node 432 in the output layer 430 and the likelihood of the second component is output to the node 434 in the output layer 430.

In some embodiments, the neural network 400 is implemented using the network management system 700 (FIG. 7). In some embodiments, the neural network 400 is implemented using hardware other than the network management system 700 (FIG. 7).

In comparison with other approaches, the neural network 400 is able to generate weights for use by network management systems, such as network management system 100 (FIG. 1), network management system 200 (FIG. 2), or another suitable network management system, to facilitate processing of the log data. The network management system is then able to format log data to generate a UML diagram that is usable for identifying errors within the network. The network management system is also able to generate alerts for resolving errors within the network in order to help improve the performance of the network and increase customer satisfaction. The use of the neural network 400 helps to improve accuracy and efficiency of the network management system without interaction with the network manager during processing of the log data.

Figure 5:
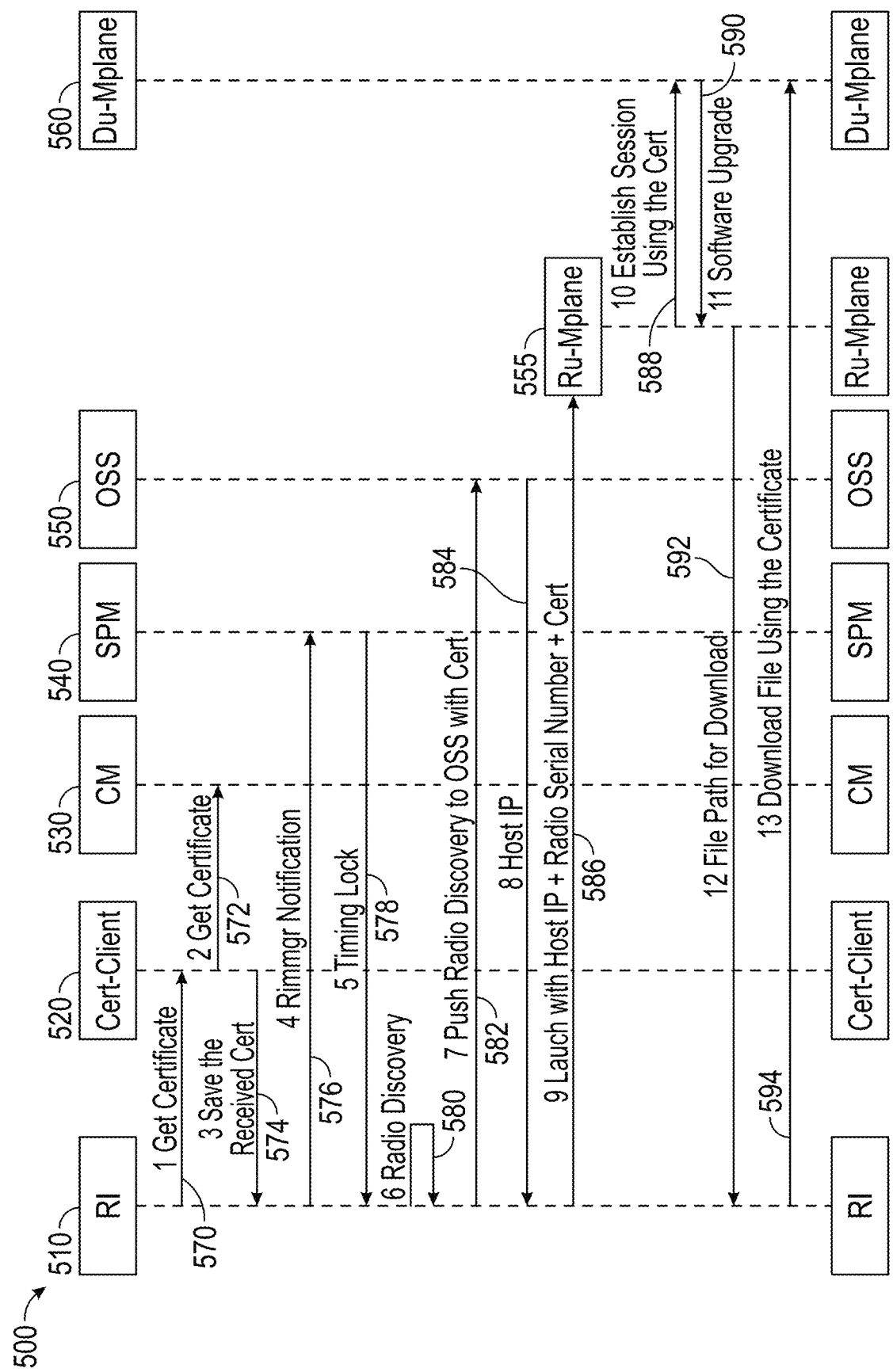
FIG. 5 is a sequence diagram of signals within a network, in accordance with some embodiments.

FIG. 5 is a sequence diagram 500 of signals within a network, in accordance with some embodiments. The sequence diagram 500 is an example to help explain functionality of the network management system 100 (FIG. 1) or network management system 200 (FIG. 2). One of ordinary skill in the art would understand that the network management system 100 (FIG. 1) and the network management system 200 (FIG. 2) are usable for processing log data based on other interactions between components in a network.

The sequence diagram 500 is an example of a RAN information management (RIM) certification integration. The sequence diagram 500 describes interactions between a radio interface (RI) 510, a certification client 520, a certification module (CM) 530, a S-plane module 540, an operation support system (OSS) 550, a radio unit management plane (ru-mplane) 555, and a distributed unit management plane (du-mplane) 560. The RI 510 is configured to manage requests and transfer o information between nodes with an RAN network, such as O-RAN. The certification client 520 is configured to provide an interface between the RI 510 and the CM 530. The CM 530 is configured to store certifications for nodes within the network. The S-plane module 540 is configured to control a timing clock usable for coordinating communication between nodes in the network. The OSS 550 is configured to help manage the communication between nodes within the network. The ru-mplane 555 is configured to carry management messages between various radio units. The du-mplane 560 is configured to carry management messages between various distributed units.

In operation 570, the RI 510 requests a certification from the certification client 520. In operation 572, the certification client 520 requests the certification from the CM 530. In operation 574, the certification client 520 provides the certification received from the CM 530 to the RI 510. In operation 576, the RI 510 transmits a notification to the S-plane module 540. In operation 578, the S-plane module 540 confirms a timing lock with the RI 510. In operation 580, the RI 510 discovers a radio unit managed by the RI 510. In operation 582, the RI 510 provides information about the discovered radio unit to the OSS 550. In operation 584, the OSS 550 provides a host Internet protocol (IP) address for the radio unit to the RI 510. In operation 586, the RI 510 provides the host IP address, the serial number of the discovered radio unit and the certification to the ru-mplane 555. In operation 588, the ru-mplane 555 establishes a connection with the du-mplane 560 using the certificate received in operation 586. In operation 590, the du-mplane 560 provides information related to a software upgrade to the ru-mplane 555. In operation 592, the ru-mplane 555 provides a file path for downloading the software upgrade to the RI 510. In operation 594, the RI 510 downloads the software upgrade file from the du-mplane 560 for installation on the radio unit using the certification.

During the operations of the various components in the network for completion of the actions described in the sequence diagram 500, log data is generated. The log data indicates the type of action each of the components is seeking to perform and whether those actions resulted in success or failure. In some embodiments, the log data further includes information related to a cause of a failure for complete the designed action. Operations that involve multiple components would generate log data involving multiple components, e.g., log data received at 115 (FIG. 1). Operations that involve a single component, such as operation 580, would generate log data involving a single component, e.g., log data received at 110 (FIG. 1).

In some instances, a first network manager is responsible for monitoring the RI 510 and a second network manager is responsible for monitoring the OSS 550. In such a situation, if log data generated by the RI 510 reports a failure at operation 582 for a lack of response, the first network manager has an increased risk of being unable to properly diagnose or repair the source of the error. For example, in a situation where the OSS 550 is experiencing a power outage, but the first network manager is unable to access the OSS 550 to determine that the OSS 550 is in a power outage, the first network manager could spend time attempting to identify a problem with the RI 510 when no error actually exists in the RI 510.

The network management system 100 (FIG. 1) and the network management system 200 (FIG. 2) help to avoid such a problem because the network management systems are able to automatically receive and process the log data from both the RI 510 and the OSS 550. Using this log data, the network management systems are able to generate UML diagrams which provide the first network manager with information related to a source of the error in operation 582 being with the OSS 550. Therefore, the first network manager does not expect time and resources searching for an error in the RI 510. Additionally, in some embodiments, the network management systems are able to provide an alert to a user terminal accessible by the second network manager regarding the error in the OSS 550, as discussed above. As a result, the second network manager is able to quickly identify and resolve the error in the OSS 550 and the operation of the sequence diagram 500 is able to be restored more quickly than in other approaches that do not include the network management system 100 (FIG. 1) or the network management system 200 (FIG. 2). An effect of the quicker restoration of the functionality of the sequence diagram 500 is improved customer satisfaction and overall network health.

Figure 6:
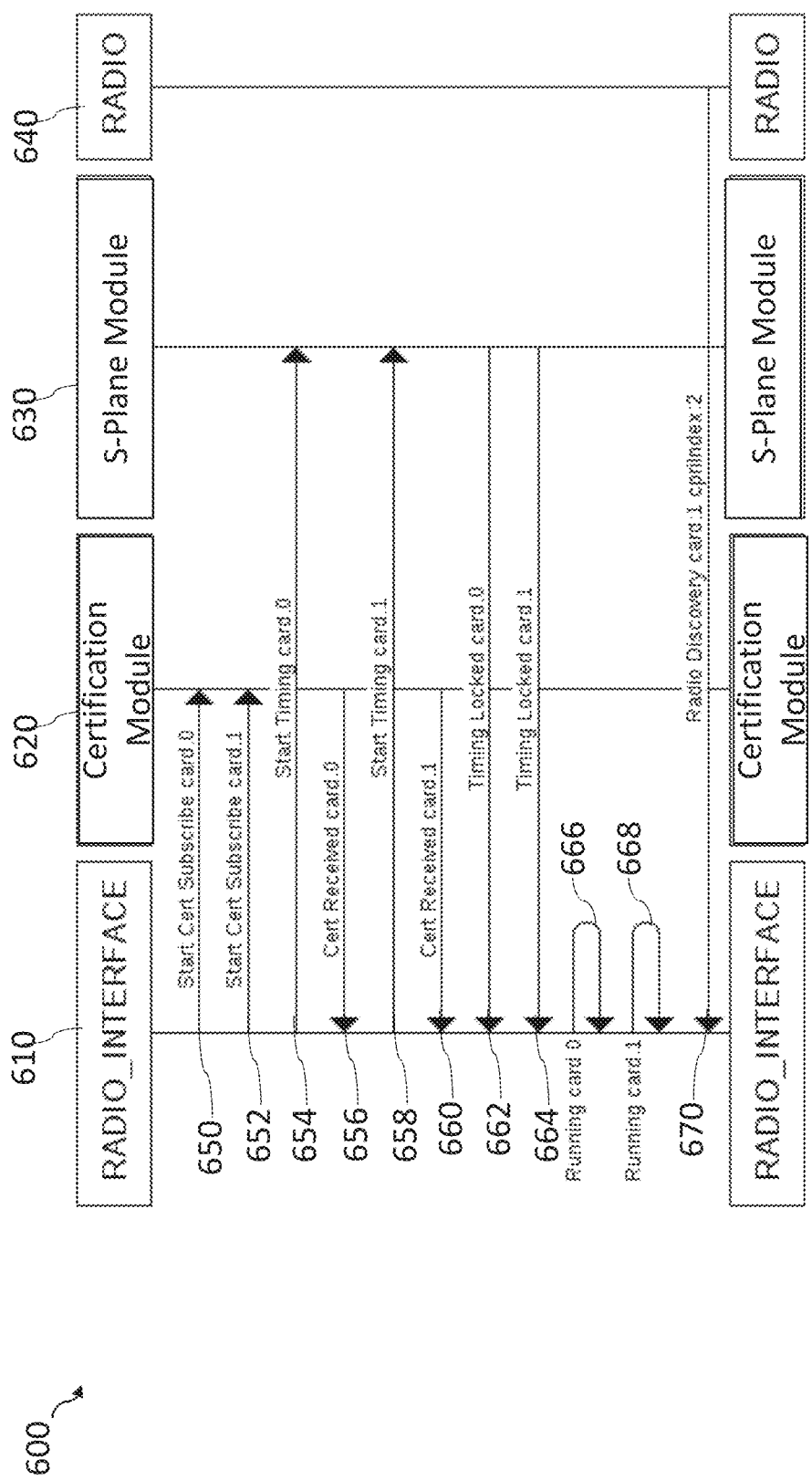
FIG. 6 is a sequence diagram of signals within a network, in accordance with some embodiments.

FIG. 6 is a sequence diagram 600 of signals within a network, in accordance with some embodiments. The sequence diagram 500 is an example to help explain functionality of the network management system 100 (FIG. 1) or network management system 200 (FIG. 2). One of ordinary skill in the art would understand that the network management system 100 (FIG. 1) and the network management system 200 (FIG. 2) are usable for processing log data based on other interactions between components in a network.

The sequence diagram 600 is an example of establishing a connection between a radio unit and a radio interface. The sequence diagram 600 describes interactions between a radio interface 610, a certification manager 620, an S-plane module 630, and a radio unit 640. The radio interface 610 is configured to provide a connection between the radio unit 640 and other equipment within the network. The certification manager 620 is configured to store certifications for nodes within the network. The S-plane module 630 is configured to control a timing clock usable for coordinating communication between nodes in the network. The radio unit 640 is configured to exchange information with mobile terminals to allow the mobile terminals to communicate with the network.

In operation 650, the radio interface 610 requests a certification for a first card from the certification manager 620. In operation 652, the radio interface 610 requests a certification for a second card from the certification manager 620. In operation 654, the radio interface 610 transmits a notification to the S-plane module 630 for the first card. In operation 656, the radio interface 610 receives the certification for the first card from the certification manager 620. In operation 658, the radio interface 610 transmits a notification to the S-plane module 630 for the second card. In operation 660, the radio interface 610 receives the certification for the second card from the certification manager 620. In operation 662, the radio interface 610 receives confirmation of a timing lock for the first card from the S-plane module 630. In operation 664, the radio interface 610 receives confirmation of a timing lock of a second card from the S-plane module 630. In operation 666, the radio interface 610 runs the first card. In operation 668, the radio unit 668 runs the second card. In operation 670, the radio interface 610 is able to discover the radio unit 640 using the second card and a common public radio interface (CPRI) index.

During the operations of the various components in the network for completion of the actions described in the sequence diagram 600, log data is generated. The log data indicates the type of action each of the components is seeking to perform and whether those actions resulted in success or failure. In some embodiments, the log data further includes information related to a cause of a failure for complete the designed action. Operations that involve multiple components would generate log data involving multiple components, e.g., log data received at 115 (FIG. 1). Operations that involve a single component, such as operation 580, would generate log data involving a single component, e.g., log data received at 110 (FIG. 1).

In some instances, a first network manager is responsible for monitoring the radio interface 610 and a second network manager is responsible for monitoring the certification manager 620. In such a situation, if log data generated by the radio interface 610 reports a failure at operation 652 for a lack of response, the first network manager has an increased risk of being unable to properly diagnose or repair the source of the error. For example, in a situation where the certification manager 620 has a receiver that is disabled, the certification manager 620 would not be able to respond to the radio interface 610. However, the first network manager is unable to access the certification manager 620 to determine that the certification manager 620 is experiencing problem. As a result, the first network manager could spend time attempting to identify a problem with the radio interface 610 when no error actually exists in the radio interface 610.

The network management system 100 (FIG. 1) and the network management system 200 (FIG. 2) help to avoid such a problem because the network management systems are able to automatically receive and process the log data from both the radio interface 610 and the certification manager 620. Using this log data, the network management systems are able to generate UML diagrams which provide the first network manager with information related to a source of the error in operation 652 being with the certification manager 620. Therefore, the first network manager does not expect time and resources searching for an error in the radio interface 610. Additionally, in some embodiments, the network management systems are able to provide an alert to a user terminal accessible by the second network manager regarding the error in the certification manager 620, as discussed above. As a result, the second network manager is able to quickly identify and resolve the error in the certification manager 620 and the operation of the sequence diagram 600 is able to be restored more quickly than in other approaches that do not include the network management system 100 (FIG. 1) or the network management system 200 (FIG. 2). In some embodiments, the network management systems are able to detect the problem with the receiver of the certification manager 620 and transmit an alert to a maintenance crew to repair the receiver. An effect of the quicker restoration of the functionality of the sequence diagram 600 is improved customer satisfaction and overall network health.

FIG. 7 is a block diagram of a network management system 700, in accordance with some embodiments. System 700 includes a hardware processor 702 and a non-transitory, computer readable storage medium 704 encoded with, i.e., storing, the computer program code 706, i.e., a set of executable instructions. Computer readable storage medium 704 is also encoded with instructions 707 for interfacing with external devices. The processor 702 is electrically coupled to the computer readable storage medium 704 via a bus 708. The processor 702 is also electrically coupled to an I/O interface 710 by bus 708. A network interface 712 is also electrically connected to the processor 702 via bus 708. Network interface 712 is connected to a network 714, so that processor 702 and computer readable storage medium 704 are capable of connecting to external elements via network 714. The processor 702 is configured to execute the computer program code 706 encoded in the computer readable storage medium 704 in order to cause system 700 to be usable for performing a portion or all of the operations as described in the network manage system 100 (FIG. 1), the network management system 200 (FIG. 2), or the machine learning system 300 (FIG. 3).

In some embodiments, the processor 702 is a central processing unit (CPU), a multi-processor, a distributed processing system, an application specific integrated circuit (ASIC), and/or a suitable processing unit.

In some embodiments, the computer readable storage medium 704 is an electronic, magnetic, optical, electromagnetic, infrared, and/or a semiconductor system (or apparatus or device). For example, the computer readable storage medium 704 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 704 includes a compact disk-read only memory (CD-ROM), a compact disk-read/write (CD-R/W), and/or a digital video disc (DVD).

In some embodiments, the storage medium 704 stores the computer program code 706 configured to cause system 700 to perform a portion or all of the operations as described in the network manage system 100 (FIG. 1), the network management system 200 (FIG. 2), or the machine learning system 300 (FIG. 3). In some embodiments, the storage medium 704 also stores information needed for performing a portion or all of the operations as described in the network manage system 100 (FIG. 1), the network management system 200 (FIG. 2), or the machine learning system 300 (FIG. 3) as well as information generated during performing a portion or all of the operations as described in the network manage system 100 (FIG. 1), the network management system 200 (FIG. 2), or the machine learning system 300 (FIG. 3), such as a weights parameter 716, a log format parameter 718, a rules parameter 720, a UML diagram parameter 722 and/or a set of executable instructions to perform the operation of a portion or all of the operations as described in the network manage system 100 (FIG. 1), the network management system 200 (FIG. 2), or the machine learning system 300 (FIG. 3).

In some embodiments, the storage medium 704 stores instructions 707 for interfacing with external devices. The instructions 707 enable processor 702 to generate instructions readable by the external devices to effectively implement a portion or all of the operations as described in the network manage system 100 (FIG. 1), the network management system 200 (FIG. 2), or the machine learning system 300 (FIG. 3).

System 700 includes I/O interface 710. I/O interface 710 is coupled to external circuitry. In some embodiments, I/O interface 710 includes a keyboard, keypad, mouse, trackball, trackpad, and/or cursor direction keys for communicating information and commands to processor 702.

System 700 also includes network interface 712 coupled to the processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in the network manage system 100 (FIG. 1), the network management system 200 (FIG. 2), or the machine learning system 300 (FIG. 3) is implemented in two or more systems 700, and information such as weights parameter 716, log format parameter 718, rules parameter 720, or UML diagram parameter 722 is exchanged between different systems 700 via network 714.

Supplemental Note 1

A network management system includes a non-transitory computer readable medium configured to store instructions thereon. The network management system further includes a processor connected to the non-transitory computer readable medium. The processor is configured to execute the instructions for receiving first log data from a first component in a network, wherein the first log data comprises first log information. The processor is configured to execute the instructions for parsing the first log data using a trained neural network to define parsed log data, wherein parsing the first log data comprises organizing the first log information into a predefined sequence of information, and the parsed log data comprises at least a signal source and a signal message. The processor is configured to execute the instructions for generating a unified model language (UML) diagram based on the parsed log data. The processor is configured to execute the instructions for determining whether an error is present in the first component based on the UML diagram.

Supplemental Note 2

The network management system of Supplemental Note 1, wherein the processor is further configured to execute the instructions for filtering the first log data, wherein filtering the first log data comprises removing a portion of the first log information; and parsing the first log data using the filtered log data.

Supplemental Note 3

The network management system of Supplemental Note 1 or 2, wherein the first log information comprises data related to an interaction between the first component and a second component in the network.

Supplemental Note 4

The network management system of any of Supplemental Notes 1-3, wherein the processor is further configured to execute the instructions for: parsing the first log data to generate the parsed log data further comprising a signal destination.

Supplemental Note 5

The network management system of any of Supplemental Notes 1-4, wherein the processor is further configured to execute the instructions for: determining whether the identified error is related to the first component or the second component based on the UML diagram.

Supplemental Note 6

The network management system of any of Supplemental Notes 1-5, wherein the processor is further configured to execute instructions for: receiving second log data from the second component, wherein the second log data comprises second log information; combining the first log information and the second log information to define a combined log information; and parsing the first log data by parsing the combined log information.

Supplemental Note 7

The network management system of any of Supplemental Notes 1-6, wherein the processor is further configured to execute the instructions for: generating an alert in response to determining the error is present; and instructing a transmitter to transmit the alert to a terminal accessible by a network manager responsible for the first component.

Supplemental Note 8

A network management method comprising receiving first log data from a first component in a network, wherein the first log data comprises first log information. The network management method includes parsing, using a processor, the first log data using a trained neural network to define parsed log data, wherein parsing the first log data comprises organizing the first log information into a predefined sequence of information, and the parsed log data comprises at least a signal source and a signal message. The network management method includes generating, using the processor, a unified model language (UML) diagram based on the parsed log data. The network management method includes determining, using the processor, whether an error is present in the first component based on the UML diagram.

Supplemental Note 9

The network management method of Supplemental Note 8, further comprising: filtering the first log data, wherein filtering the first log data comprises removing a portion of the first log information, wherein parsing the first log data comprises parsing the first log data using the filtered log data.

Supplemental Note 10

The network management method of Supplemental Note 8 or 9, wherein the first log information comprises data related to an interaction between the first component and a second component in the network.

Supplemental Note 11

The network management method of any of Supplemental Notes 8-10, wherein parsing the first log data comprises generating the parsed log data further comprising a signal destination.

Supplemental Note 12

The network management method of any of Supplemental Notes 8-11, further comprising: determining whether the identified error is related to the first component or the second component based on the UML diagram.

Supplemental Note 13

The network management method of any of Supplemental Notes 8-12, further comprising: receiving second log data from the second component, wherein the second log data comprises second log information; and combining the first log information and the second log information to define a combined log information, wherein parsing the first log data comprises parsing the combined log information.

Supplemental Note 14

The network management method of any of Supplemental Notes 8-13, further comprising: generating an alert in response to determining the error is present; and transmitting the alert to a terminal accessible by a network manager responsible for the first component.

Supplemental Note 15

A non-transitory computer readable medium configured to store instructions thereon for causing a processor to receive first log data from a first component in a network, wherein the first log data comprises first log information. The instructions are configured to cause the processor to parse the first log data using a trained neural network to define parsed log data, wherein parsing the first log data comprises organizing the first log information into a pre-defined sequence of information, and the parsed log data comprises at least a signal source and a signal message. The instructions are configured to cause the processor to generate a unified model language (UML) diagram based on the parsed log data. The instructions are configured to cause the processor to determine whether an error is present in the first component based on the UML diagram.

Supplemental Note 16

The non-transitory computer readable medium of Supplemental Note 15, wherein the instructions are further configured to cause the processor to: filter the first log data to remove a portion of the first log information; and parse the first log data using the filtered log data.

Supplemental Note 17

The non-transitory computer readable medium of Supplemental Note 15 or 16, wherein the first log information comprises data related to an interaction between the first component and a second component in the network.

Supplemental Note 18

The non-transitory computer readable medium of any of Supplemental Notes 15-17, wherein the instructions are further configured to cause the processor to: parse the log data to generate the parsed log data further comprising a signal destination.

Supplemental Note 19

The non-transitory computer readable medium of any of Supplemental Notes 15-18, wherein the instructions are further configured to cause the processor to: determine whether the identified error is related to the first component or the second component based on the UML diagram.

Supplemental Note 20

The non-transitory computer readable medium of any of Supplemental Notes 15-19, wherein the instructions are further configured to cause the processor to: receive second log data from the second component, wherein the second log data comprises second log information; combine the first log information and the second log information to define a combined log information; and parse the first log data by parsing the combined log information.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A network management system comprising:
 a non-transitory computer readable medium configured to store instructions thereon; and
 a processor connected to the non-transitory computer readable medium, wherein the processor is configured to execute the instructions for:

receiving first log data from a first component in a network, wherein the first log data comprises first log information;

parsing the first log data using a trained neural network to define parsed log data, wherein parsing the first log data comprises organizing the first log information into a predefined sequence of information, and the parsed log data comprises at least a signal source and a signal message;

generating a unified model language (UML) diagram based on the parsed log data; and determining whether an error is present in the first component based on the UML diagram.

2. The network management system of claim 1, wherein the processor is further configured to execute the instructions for:

filtering the first log data, wherein filtering the first log data comprises removing a portion of the first log information; and parsing the first log data using the filtered log data.

3. The network management system of claim 1, wherein the first log information comprises data related to an interaction between the first component and a second component in the network.

4. The network management system of claim 3, wherein the processor is further configured to execute the instructions for:

parsing the first log data to generate the parsed log data further comprising a signal destination.

5. The network management system of claim 3, wherein the processor is further configured to execute the instructions for:

determining whether the identified error is related to the first component or the second component based on the UML diagram.

6. The network management system of claim 3, wherein the processor is further configured to execute instructions for:

receiving second log data from the second component, wherein the second log data comprises second log information;

combining the first log information and the second log information to define a combined log information; and parsing the first log data by parsing the combined log information.

7. The network management system of claim 1, wherein the processor is further configured to execute the instructions for:

generating an alert in response to determining the error is present; and instructing a transmitter to transmit the alert to a terminal accessible by a network manager responsible for the first component.

8. A network management method comprising:

receiving first log data from a first component in a network, wherein the first log data comprises first log information;

parsing, using a processor, the first log data using a trained neural network to define parsed log data, wherein parsing the first log data comprises organizing the first log information into a predefined sequence of information, and the parsed log data comprises at least a signal source and a signal message;

generating, using the processor, a unified model language (UML) diagram based on the parsed log data; and determining, using the processor, whether an error is present in the first component based on the UML diagram.

9. The network management method of claim 8, further comprising:

filtering the first log data, wherein filtering the first log data comprises removing a portion of the first log information, wherein parsing the first log data comprises parsing the first log data using the filtered log data.

10. The network management method of claim 8, wherein the first log information comprises data related to an interaction between the first component and a second component in the network.

11. The network management method of claim 10, wherein parsing the first log data comprises generating the parsed log data further comprising a signal destination.

12. The network management method of claim 10, further comprising:

determining whether the identified error is related to the first component or the second component based on the UML diagram.

13. The network management method of claim 10, further comprising:

receiving second log data from the second component, wherein the second log data comprises second log information; and combining the first log information and the second log information to define a combined log information, wherein parsing the first log data comprises parsing the combined log information.

14. The network management method of claim 8, further comprising:

generating an alert in response to determining the error is present; and transmitting the alert to a terminal accessible by a network manager responsible for the first component.

15. A non-transitory computer readable medium configured to store instructions thereon for causing a processor to:

receive first log data from a first component in a network, wherein the first log data comprises first log information;

parse the first log data using a trained neural network to define parsed log data, wherein parsing the first log data comprises organizing the first log information into a predefined sequence of information, and the parsed log data comprises at least a signal source and a signal message;

generate a unified model language (UML) diagram based on the parsed log data; and determine whether an error is present in the first component based on the UML diagram.

16. The non-transitory computer readable medium of claim 15, wherein the instructions are further configured to cause the processor to:

filter the first log data to remove a portion of the first log information; and parse the first log data using the filtered log data.

17. The non-transitory computer readable medium of claim 15, wherein the first log information comprises data related to an interaction between the first component and a second component in the network.

18. The non-transitory computer readable medium of claim 17, wherein the instructions are further configured to cause the processor to:

parse the log data to generate the parsed log data further comprising a signal destination.

19. The non-transitory computer readable medium of claim 17, wherein the instructions are further configured to cause the processor to:
   determine whether the identified error is related to the first component or the second component based on the UML diagram.

20. The non-transitory computer readable medium of claim 17, wherein the instructions are further configured to cause the processor to:
   receive second log data from the second component, wherein the second log data comprises second log information;
   combine the first log information and the second log information to define a combined log information; and
   parse the first log data by parsing the combined log information.

* * * * *